US012687642B2

(12) United States Patent
Zhu

(10) Patent No.: US 12,687,642 B2
(45) Date of Patent: Jul. 21, 2026

(54) COMMUNICATION METHODS AND APPARATUSES, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 481 days.

(21) Appl. No.: 18/266,660

(22) PCT Filed: Dec. 11, 2020

(86) PCT No.: PCT/CN2020/135877
§ 371 (c)(1),
(2) Date: Jun. 12, 2023

(87) PCT Pub. No.: WO2022/120831
PCT Pub. Date: Jun. 16, 2022

(65) Prior Publication Data
US 2024/0045076 A1 Feb. 8, 2024

(51) Int. Cl.
*G01S 19/21* (2010.01)
*H04W 72/0446* (2023.01)
*H04W 72/51* (2023.01)

(52) U.S. Cl.
CPC ......... *G01S 19/21* (2013.01); *H04W 72/0446* (2013.01); *H04W 72/51* (2023.01)

(58) Field of Classification Search
CPC .... G01S 19/21; H04W 72/0446; H04W 72/51
See application file for complete search history.

(56) References Cited

U.S. PATENT DOCUMENTS

| | | | |
|---|---|---|---|
| 10,306,661 B2 | 5/2019 | Caretti et al. | |
| 10,841,932 B2 * | 11/2020 | Wu ................... | H04W 52/0245 |
| 2012/0040620 A1 | 2/2012 | Fu et al. | |
| 2012/0040715 A1 | 2/2012 | Fu et al. | |
| 2014/0036882 A1 * | 2/2014 | Baghel .................. | H04L 5/0058 |
| | | | 370/336 |
| 2014/0235175 A1 | 8/2014 | Fu et al. | |
| 2016/0099744 A1 | 4/2016 | Fu et al. | |
| 2017/0318599 A1 * | 11/2017 | Caretti .............. | H04W 72/0446 |
| 2019/0281546 A1 | 9/2019 | Lim et al. | |

(Continued)

FOREIGN PATENT DOCUMENTS

| | | |
|---|---|---|
| CN | 102511157 A | 6/2012 |
| CN | 108260213 A | 7/2018 |
| CN | 111988742 A | 11/2020 |

OTHER PUBLICATIONS

European Patent Office, Extended European Search Report Issued in Application No. 20964767.6, Dec. 7, 2023, Germany, 9 pages.

(Continued)

*Primary Examiner* — Kashif Siddiqui
(74) *Attorney, Agent, or Firm* — Volpe Koenig

(57) ABSTRACT

A communication method and apparatus, and a storage medium are provided. The method includes: determining a first time information for receiving a global navigation satellite system (GNSS) signal; based on the first time information, receiving the GNSS signal from a satellite, and performing no data transmission with a base station when the GNSS signal is received.

20 Claims, 9 Drawing Sheets

(56)         References Cited

U.S. PATENT DOCUMENTS

| 2020/0260353 | A1  |  8/2020 | Xu et al. | |
| 2021/0022155 | A1* |  1/2021 | Wu ....................... | H04B 1/3805 |
| 2021/0067990 | A1* |  3/2021 | Opshaug .............. | G01S 5/0036 |
| 2021/0314107 | A1* | 10/2021 | Yoshioka .............. | H04L 1/1819 |
| 2022/0038927 | A1* |  2/2022 | Manolakos ......... | H04W 64/003 |

OTHER PUBLICATIONS

ISA State Intellectual Property Office of the People's Republic of China, Written Opinion of the International Searching Authority Issued in Application No. PCT/CN2020/135877, Aug. 26, 2021, WIPO, 7 pages.

State Intellectual Property Office of the People's Republic of China, Office Action and Search Report Issued in Application No. 2020800039397, Feb. 16, 2025, 19 pages.

ISA State Intellectual Property Office of the People's Republic of China, International Search Report Issued in Application No. PCT/CN2020/135877, Aug. 26, 2021, WIPO, 4 pages.

* cited by examiner

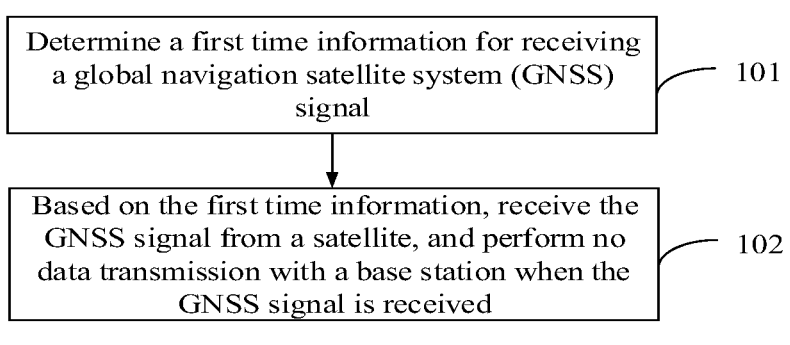

FIG. 1

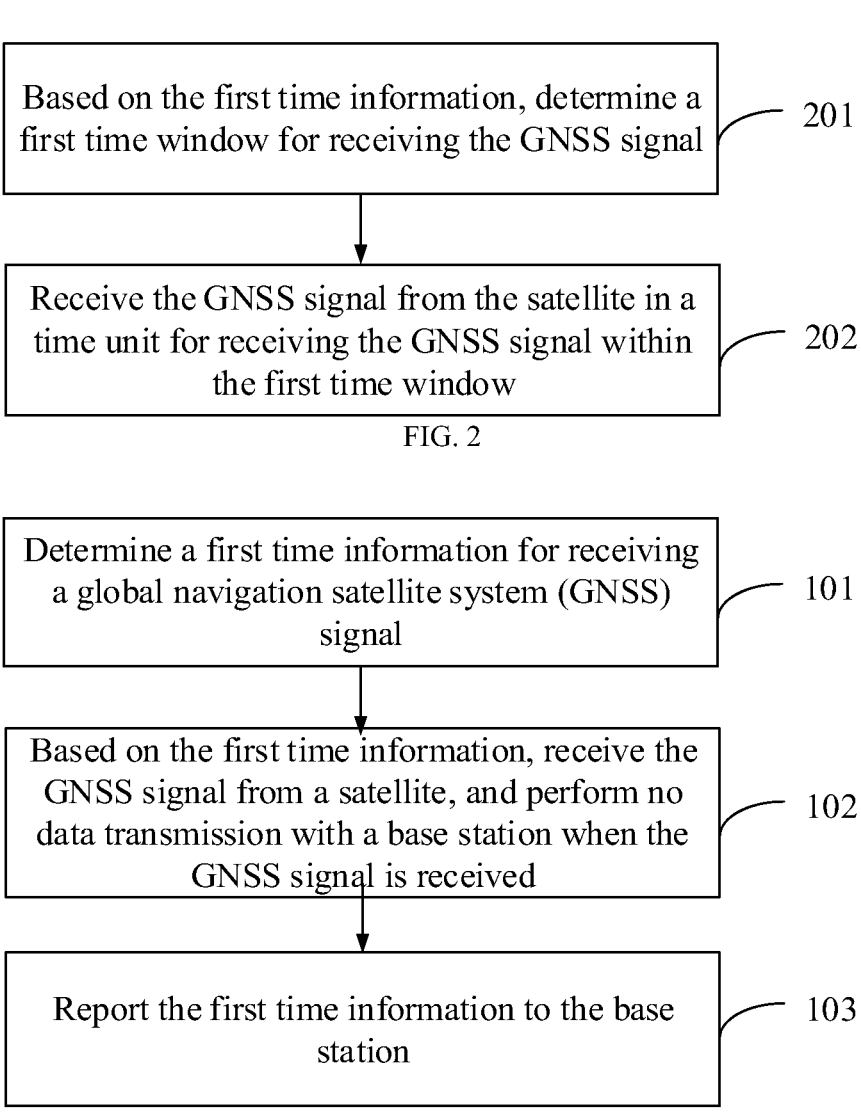

| Based on the first time information, determine a first time window for receiving the GNSS signal | 201 |

| Receive the GNSS signal from the satellite in a time unit for receiving the GNSS signal within the first time window | 202 |

FIG. 2

| Determine a first time information for receiving a global navigation satellite system (GNSS) signal | 101 |

| Based on the first time information, receive the GNSS signal from a satellite, and perform no data transmission with a base station when the GNSS signal is received | 102 |

| Report the first time information to the base station | 103 |

FIG. 3

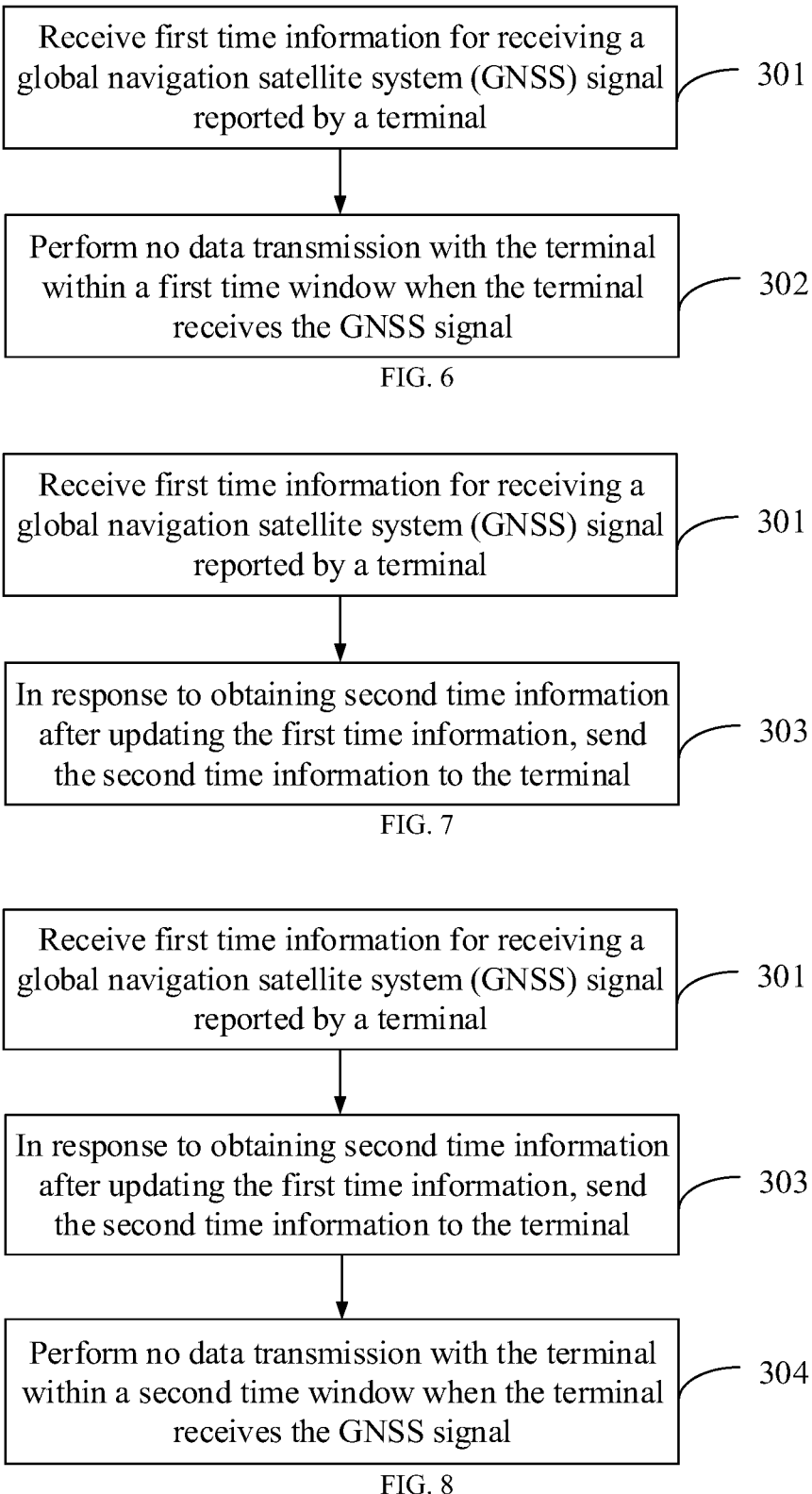

Receive first time information for receiving a global navigation satellite system (GNSS) signal reported by a terminal — 301

Perform no data transmission with the terminal within a first time window when the terminal receives the GNSS signal — 302

FIG. 6

Receive first time information for receiving a global navigation satellite system (GNSS) signal reported by a terminal — 301

In response to obtaining second time information after updating the first time information, send the second time information to the terminal — 303

FIG. 7

Receive first time information for receiving a global navigation satellite system (GNSS) signal reported by a terminal — 301

In response to obtaining second time information after updating the first time information, send the second time information to the terminal — 303

Perform no data transmission with the terminal within a second time window when the terminal receives the GNSS signal — 304

FIG. 8

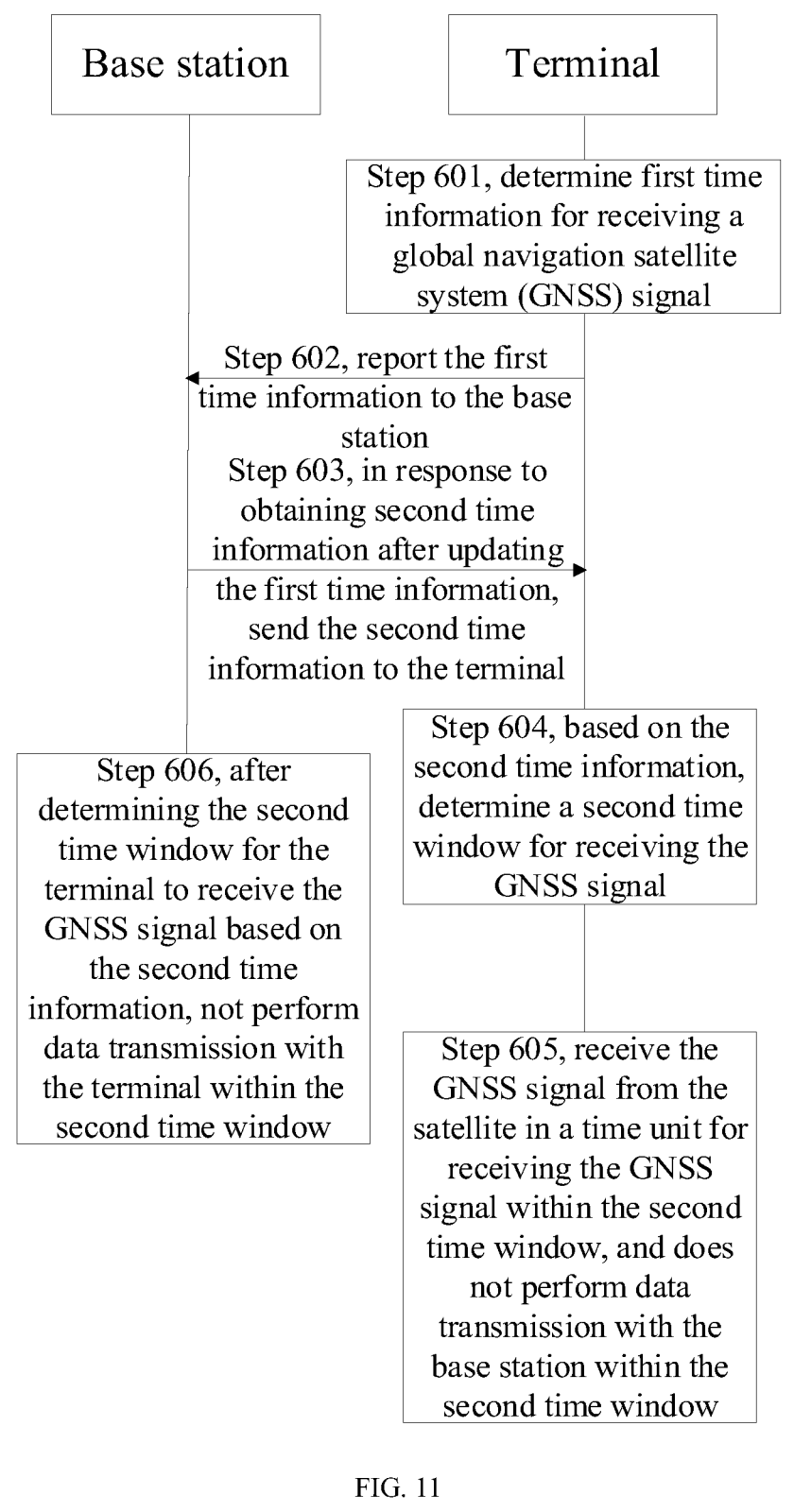

| Base station | Terminal |
|---|---|

Step 601, determine first time information for receiving a global navigation satellite system (GNSS) signal Step 602, report the first time information to the base station Step 603, in response to obtaining second time information after updating the first time information, send the second time information to the terminal Step 604, based on the second time information, determine a second time window for receiving the GNSS signal Step 606, after determining the second time window for the terminal to receive the GNSS signal based on the second time information, not perform data transmission with the terminal within the second time window Step 605, receive the GNSS signal from the satellite in a time unit for receiving the GNSS signal within the second time window, and does not perform data transmission with the base station within the second time window

FIG. 11

COMMUNICATION METHODS AND APPARATUSES, AND STORAGE MEDIUM

CROSS REFERENCE TO RELATED APPLICATIONS

The present application is a U.S. national phase of International Application No. PCT/CN2020/135877, filed on Dec. 11, 2020, the disclosure of which is hereby incorporated by reference in its entirety for all purposes.

TECHNICAL FIELD

The present disclosure relates to the field of communication technology, and in particular, to communication methods, apparatuses, and storage media.

BACKGROUND

Research on wireless communication technology shows that satellite communication plays a very important role in the development of wireless communication technology in the future. The satellite communication refers to communication conducted by radio communication devices on the ground that uses satellites as a relay. A satellite communication system consists of satellites and devices on the ground. It is characterized as having widespread communication areas. The communication can be conducted between any two points within areas covered by the satellites, and it is not easily influenced by land calamities (highly reliable).

SUMMARY

In the present disclosure, communication methods, apparatuses, and storage media are provided.

According to a first aspect of the present disclosure, there is provided a communication method used for a terminal, including: determining first time information for receiving a global navigation satellite system (GNSS) signal; and based on the first time information, receiving the GNSS signal from a satellite, and performing no data transmission with a base station when the GNSS signal is received.

According to a second aspect of the present disclosure, there is provided a communication method used for a base station, including: receiving first time information for receiving a global navigation satellite system (GNSS) signal reported by a terminal; and performing no data transmission with the terminal within a first-time window when the terminal receives the GNSS signal; where the first-time window is determined based on the first time information.

According to a third aspect of the present disclosure, there is provided a communication method used for a base station, including: determining third time information for a terminal to receive a global navigation satellite system (GNSS) signal; sending the third time information to the terminal; and performing no data transmission with the terminal within a third time window when the terminal receives the GNSS signal, where the third time window is determined based on the third time information.

According to a fourth aspect of the present disclosure, there is provided a communication apparatus, including: a processor and a memory for storing processor-executable instructions. Where the processor is configured to perform the communication method of the above first aspect.

According to a fifth aspect of the present disclosure, a communication apparatus is provided, including a processor and a memory for storing processor-executable instructions.

Where the processor is configured to perform the communication method of the above second or third aspect.

According to a sixth aspect of the present disclosure, there is provided a communication system including: a terminal and a base station, wherein the terminal is configured to perform the communication method of the above first aspect and the base station is configured to perform the communication method of the above second aspect.

According to a seventh aspect of the present disclosure, there is provided a communication system including: a base station and a terminal, wherein the base station is configured to perform the communication method of the above third aspect.

It should be understood that the above general description and the following detailed description are only exemplary and explanatory, and cannot limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

FIG. 1 is a flow chart illustrating a communication method according to an embodiment.

FIG. 2 is a flow chart illustrating another communication method according to the embodiment.

FIG. 3 is a flow chart illustrating another communication method according to the embodiment.

FIG. 6 is a flow chart illustrating a communication method according to an embodiment.

FIG. 7 is a flow chart illustrating another communication method according to the embodiment.

FIG. 8 is a flow chart illustrating another communication method according to the embodiment.

FIG. 11 is a flow chart illustrating a communication method according to an embodiment.

DETAILED DESCRIPTION

Figure 4:
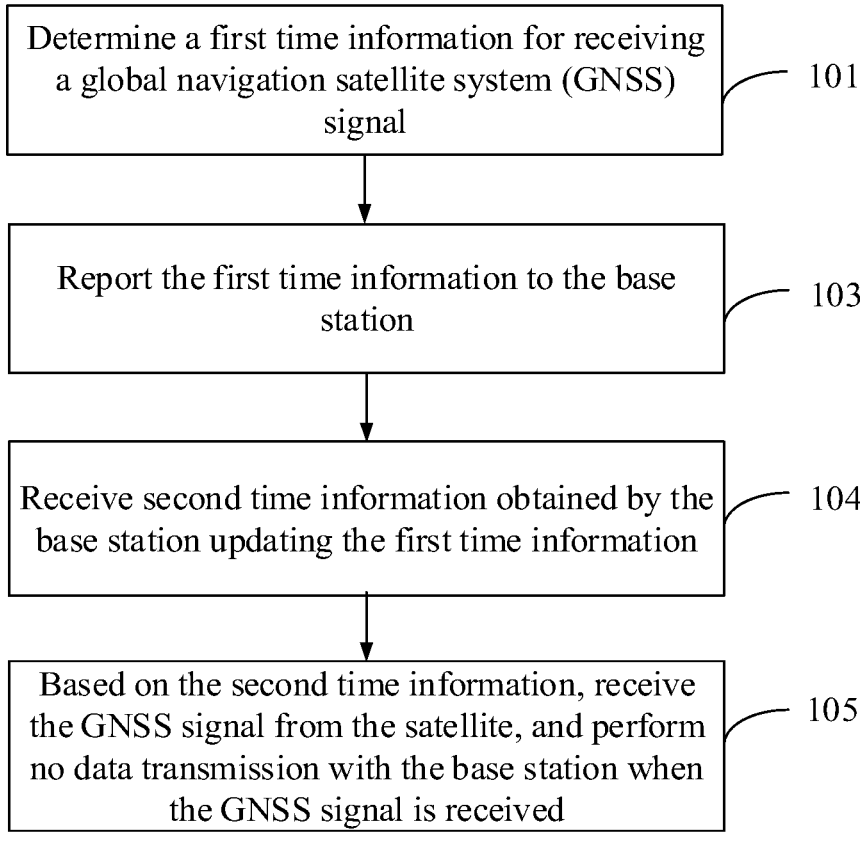
FIG. 4 is a flow chart illustrating another communication method according to the embodiment.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the", and "said" in their singular forms in the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the term "if" as used herein may be interpreted as "when," "upon," or "in response to determining.

As a complement to a cellular communication system on the ground, satellite communication has many advantages: first, it is able to cover more areas that are beyond the capability of the cellular communication system or areas that cost too much, such as seas, deserts, and remote mountain areas, and these problems can be addressed by satellite communication. Additionally, it can be used for emergency communication. For example, satellite communication can swiftly establish a communication connection in extreme situations, such as disasters like earthquakes, when infrastructure based on cellular communication is not effective. Further, it can also provide industry services such as long-distance latency-sensitive service and reduce transmission latency.

Predictably, a wireless communication system in the future will realize deep integration between the satellite communication system and the cellular communication system on the ground, and smart connections among everything will be genuinely achieved.

In some embodiments, terminals used for satellite communication are generally capable of determining position information by receiving a Global Navigation Satellite System (GNSS) signal, and there are special hardware units on the terminals for receiving the GNSS signal. Terminals can determine position by receiving the GNSS signal without affecting data exchange.

In the present disclosure, a data transmission solution is provided, which can be used by a terminal to determine time information for receiving a Global Navigation Satellite System (GNSS) signal. Below is an introduction to the communication solution of the present disclosure from the terminal side.

FIG. 1 is a flow chart illustrating a communication method according to an embodiment, which can be used for a terminal, including but not limited to an Internet of Things (IOT) terminal device or a terminal device with weak capabilities. The method may include the following steps: 101 and 102.

In Step 101, first time information for receiving a global navigation satellite system (GNSS) signal is determined.

In Step 102, based on the first time information, the GNSS signal is received from a satellite, and no data transmission with a base station is performed when the GNSS signal is received.

In the above embodiment, the terminal can determine the first time information for receiving the GNSS signal, so as to receive the GNSS signal from the satellite based on the first time information. While receiving the GNSS signal, the terminal does not perform data transmission with the base station. For the IoT terminal or the terminal with weak capabilities, asynchronous execution of the terminal receiving the GNSS signal and data transmission with the base station is supported.

In some embodiments, the terminal may determine the first time information based on terminal capability information, including but not limited to a capability for receiving the GNSS signal supported by the terminal. Alternatively, the terminal can determine the first time information according to positioning accuracy requirements, including but not limited to requirements such as a frequency for acquiring the GNSS signal. Further, the terminal can determine the first time information jointly based on the terminal capability information and the positioning accuracy requirements.

The above is only an exemplary description, and any solution in which a terminal determines the time information for receiving the GNSS signal in practical applications shall fall within the scope of protection of the present disclosure.

In an embodiment of the present disclosure, the terminal may determine the first time information for receiving the GNSS signal based on at least one of its own terminal capability information or the positioning accuracy requirements, which is easy to implement and highly usable.

FIG. 2 is a flow chart illustrating another communication method according to the embodiment shown in FIG. 1. That based on the first time information, the GNSS signal is received from the satellite, may include the following steps 201 and 202.

In Step 201, based on the first time information, a first time window for receiving the GNSS signal is determined.

In the embodiment of the present disclosure, there may be one or more first time windows for receiving the GNSS signal, which is not limited in the present disclosure.

In Step 202, the GNSS signal is received from the satellite in a time unit for receiving the GNSS signal within the first time window.

In the embodiment of the present disclosure, at least one time unit in the first time window may be used to receive the GNSS signal, and the terminal may receive the GNSS signal in a time unit for receiving the GNSS signal.

Correspondingly, no data transmission with the base station is performed when the GNSS signal is received, may include no data transmission with the base station within the first time window is performed.

The terminal may choose not to send uplink data to the base station, and/or not receive downlink data from the base station within the entire first time window for receiving the GNSS signal.

In the above embodiment, based on the first time information, the terminal may determine the first time window for receiving the GNSS signal, and receive the GNSS signal from the satellite in the time unit for receiving the GNSS signal within the first time window. In addition, the terminal does not perform data transmission with the base station within the first time window. For the IoT terminal or the terminal with weak capabilities, asynchronous execution of the terminal receiving the GNSS signal and data transmission with the base station is supported.

FIG. 3 is a flow chart illustrating another communication method according to the embodiment shown in FIG. 1, including steps 101 and 102, and may further include the following step 103.

In Step 103, the first time information is reported to the base station.

In the embodiment of the present disclosure, after determining the first time information for receiving the GNSS signal, the terminal may report the first time information to the base station. Execution sequence of Step 102 and Step 103 is not limited in the present disclosure.

After receiving the first time information, based on the first time information, the base station may determine the first time window for the terminal to receive the GNSS signal, so that within the first time window, no data transmission with the terminal is performed. In other words, no downlink data is sent to the terminal, and/or no uplink data is received from the terminal.

In the above embodiment, the terminal may report the first time information to the base station, and based on the first time information, the base station determines the first time window for the terminal to receive the GNSS signal, so that no data transmission with the terminal is performed within the first time window. For the IoT terminal or the terminal with weak capabilities, asynchronous execution of the terminal receiving the GNSS signal and data transmission with the base station is supported, which avoids waste of base station resources.

FIG. 4 is a flow chart illustrating another communication method which includes steps 101 and 103 as shown in FIG. 3, and may further include the following steps 104 and 105.

In Step 104, second time information obtained by the base station updating the first time information is received.

In the embodiment of the present disclosure, the base station obtains the second time information by updating the first time information determined by the terminal according to business requirements or scheduling requirements, etc., and the base station sends the second time information to the terminal. The terminal can receive the second time information directly.

In Step 105, based on the second time information, the GNSS signal is received from the satellite, and no data transmission with the base station is performed when the GNSS signal is received.

In the embodiment of the present disclosure, after receiving the second time information obtained by the base station update, the terminal may receive the GNSS signal based on the second time information. When receiving the GNSS signal based on the second time information, the terminal may choose not to perform data transmission with the base station, including but not limited to not sending uplink data to the base station, and/or not receiving downlink data from the base station.

In the above embodiment, the base station obtains the second time information by updating the first time information from the terminal. After receiving the second time information, the terminal may receive the GNSS signal based on the second time information. No data transmission with the base station is performed within a second time window determined based on second time information. For the IoT terminal or the terminal with weak capabilities, asynchronous execution of the terminal receiving the GNSS signal and data transmission with the base station is supported.

In some embodiments, the manner in which the terminal receives the GNSS signal based on the second time information may be similar to the manner in which the terminal receives the GNSS signal based on the first time information, including determining the second time window for receiving the GNSS signal based on the second time information. The second time window includes at least one time unit, and the terminal receives the GNSS signal from the satellite in a time unit for receiving the GNSS signal within the second time window. Correspondingly, the terminal may choose not to perform data transmission with the base station within the second time window.

In the above embodiment, the terminal may determine the second time window for receiving the GNSS signal based on the second time information obtained by the base station update. The terminal receives the GNSS signal in the time unit for receiving the GNSS signal from the satellite within the second time window. In addition, the terminal does not perform data transmission with the base station within the second time window. For the IoT terminal or the terminal with weak capabilities, asynchronous execution of the terminal receiving the GNSS signal and data transmission with the base station is supported.

In some embodiments, the first time information includes but is not limited to at least one of the following: a cycle duration for receiving the GNSS signal, a size of a time window for receiving the GNSS signal in each cycle, position information of the time unit for receiving the GNSS signal within the time window, or an offset value of a window start position of the time window in each cycle relative to a reference time unit such as a start time unit of each cycle.

Figure 5:
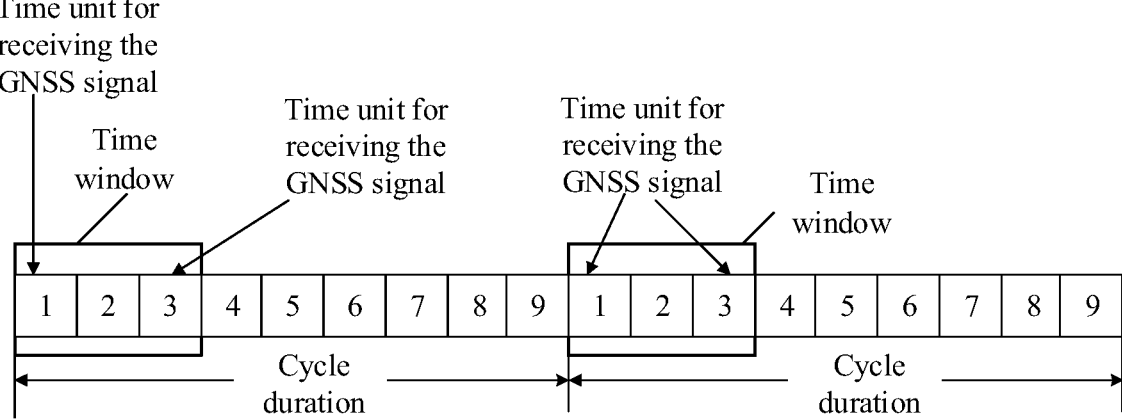
FIG. 5 is a diagram illustrating time information for receiving a Global Navigation Satellite System (GNSS) signal.

In an example, the cycle duration may refer to a time interval for cyclically receiving the GNSS signal, and the time interval may be an absolute time, such as n milliseconds (or other absolute time units), where n is a positive integer, or it can be a logical time, such as a number of predefined time units, for example, as shown in FIG. 5, the cycle duration is 9.

In another example, the cycle duration may refer to a duration occupied by each cycle for receiving the GNSS signal, and the duration may also be an absolute time or logical time.

The size of the time window for receiving the GNSS signal in each cycle may refer to a number of time units occupied by the time window in each cycle. For example, as shown in FIG. 5, the size of the time window is 3 (a unit being a size of the time unit).

The position information of the time unit for receiving the GNSS signal within the time window may include, but is not limited to, all positions within the time window, or at least one specified position within the time window. For example, as shown in FIG. 5, the position information of the time unit for receiving the GNSS signal within the time window includes a first time unit and a third time unit.

The offset value refers to the window start position of the time window in each cycle relative to the reference time unit, where the reference time unit includes, but is not limited to, an offset value reference of the start time unit of each cycle. For example, as shown in FIG. 5, if a number of the start time unit of each cycle is 1, and a number of the first time unit of the time window (that is, a number of the start position of the window) is also 1, the offset value is 0.

The above is only an exemplary description, and the terminal may determine first time information corresponding to a denser mode (or a sparser mode) according to at least one of the terminal capability information or the positioning accuracy requirements. For example, the first time information corresponding to the denser mode may include, but is not limited to, a shorter cycle, a longer time window, more time units for receiving the GNSS signal within a time window, etc.

In the above embodiment, the first time information for receiving the GNSS signal may be determined by the terminal, and includes at least one of the above items. The terminal may then receive the GNSS signal based on the first time information, without performing data transmission with the base station. For the IoT terminal or the terminal with weak capabilities, asynchronous execution of the terminal receiving the GNSS signal and data transmission with the base station is supported.

Next, the communication solution provided by the present disclosure will be introduced from the base station side.

FIG. 6 is a flow chart illustrating a communication method according to an embodiment, which can be used by a base station. The method may include the following steps: 301 and 302.

In Step 301, first time information for receiving a GNSS signal reported by a terminal is received.

In Step 302, no data transmission with the terminal is performed within a first time window when the terminal receives the GNSS signal.

In the embodiment of the present disclosure, the first time window includes at least one time window for the terminal to receive the GNSS signal, which are determined by the base station based on the first time information reported by the terminal.

In the above embodiment, based on the first time information reported by the terminal, the base station may choose not to perform data transmission with the terminal within the first time window when the terminal receives the GNSS signal. Asynchronous execution of the terminal receiving the GNSS signal and data transmission with the base station is supported, which avoids waste of base station resources.

In some embodiments, for the above Step 302, based on the first time information reported by the terminal, the base station may determine the first time window for the terminal to receive the GNSS signal. In the first time window, the base station does not send downlink data to the terminal, and/or does not receive uplink data reported by the terminal.

In the above embodiment, the base station may choose not to perform data transmission with the terminal within the first time window when the terminal receives the GNSS signal, which avoids waste of base station resources.

FIG. 7 is a flow chart illustrating another communication method, which includes step 301 as shown in FIG. 6, and may further include step 303.

In Step 303, in response to obtaining second time information after updating the first time information, the second time information is sent to the terminal.

In an embodiment of the present disclosure, the first time information includes but is not limited to at least one of the following: a cycle duration for receiving the GNSS signal, a size of a time window for receiving the GNSS signal in each cycle, time domain position information for receiving the GNSS signal within the time window, or an offset value of a window start position of the time window relative to a reference time unit in each cycle. Correspondingly, the base station may obtain the second time information by updating the first time information according to service requirements or scheduling requirements. The second time information may also include but not limited to at least one of the following: the cycle duration for receiving the GNSS signal, the size of the time window for receiving the GNSS signal in each cycle, the time domain position information for receiving the GNSS signal within the time window, or the offset value of the window start position of the time window relative to the reference time unit in each cycle. The meanings of the parameters in the second time information may be the same as the meanings of the parameters in the first time information, which will not be repeated here.

For example, the first time information includes a cycle duration of t1, the second time information obtained by the base station update includes a cycle duration of t2, and t2 is not equal to t1.

In one embodiment, the base station requires a plurality of terminals to receive the GNSS signal in a same time window or in different time windows according to business requirements, Then, based on the first time information reported by different terminals, the base station can update, and obtain the second time information corresponding to different terminals, so that the plurality of terminals can receive the GNSS signal in the same or different time windows.

In the above embodiment, the base station can update the first time information reported by the terminal, obtain the second time information, and send the second time information to the terminal, so that the terminal can receive the GNSS signal based on the second time information without performing data transmission with the base station, which is highly usable.

In some embodiments, after obtaining the second time information through update, the base station may send the second time information to the terminal through a first signaling, so that the terminal receives the GNSS signal based on the second time information. The first signaling includes but is not limited to a high-level signaling, such as a Radio Resource Control (RRC) signaling or a Media Access Control Address (MAC) Control Element (CE) signaling, or the first signaling may be a physical-layer signaling, which is not limited in the present disclosure.

In the above embodiment, the base station may send the second time information to the terminal through the first signaling, which is easy to implement and highly usable.

FIG. 8 is a flow chart illustrating another communication method according to the embodiment shown in FIG. 7, the above method may further include step 304.

In Step 304, no data transmission with the terminal is performed within a second time window when the terminal receives the GNSS signal.

In this embodiment of the present disclosure, based on the second time information obtained through update, the base station may determine at least one second time window for the terminal to receive the GNSS signal. Further, the base station does not perform data transmission with the terminal within the second time window.

In the above embodiment, the base station may also not perform data transmission with the terminal within the second time window when the terminal receives the GNSS signal. Asynchronous execution of the terminal receiving the GNSS signal and data transmission with the base station is supported, which avoids waste of base station resources.

In the present disclosure, another communication solution is also provided. Time information for the terminal to receive the GNSS signal can also be determined by the base station. The communication solution provided by the present disclosure will first be introduced from the terminal side.

Figure 9:
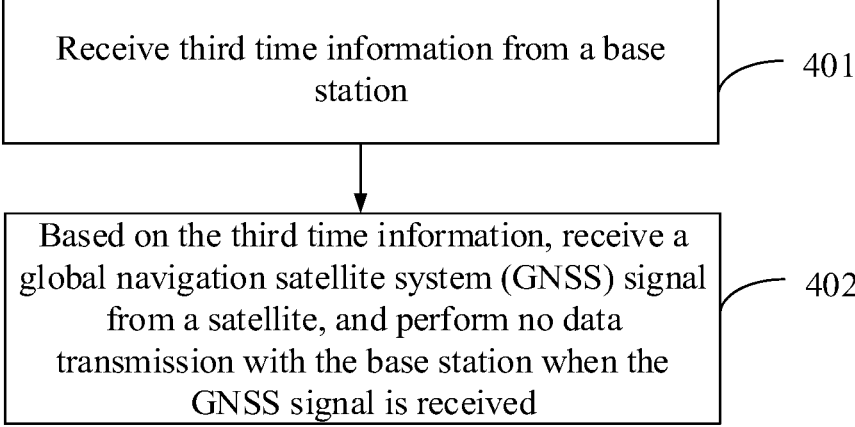
FIG. 9 is a flow chart illustrating an uplink scheduling method according to an embodiment.

FIG. 9 is a flow chart illustrating an uplink scheduling method according to an embodiment, which can be used for a terminal, including but not limited to the IoT terminal device or the terminal device with weak terminal capabilities. The method may include the following steps 401 and 402.

In Step 401, third time information is received from a base station.

In Step 402, based on the third time information, a global navigation satellite system (GNSS) signal is received from a satellite, and no data transmission with the base station is performed when the terminal receives the GNSS signal.

In the above embodiment, the terminal may receive the GNSS signal based on the third time information from the base station directly. The terminal does not perform data transmission with the base station when receiving the GNSS signal. Asynchronous execution of the terminal receiving the GNSS signal and data transmission with the base station is realized.

In some embodiments, the manner in which the terminal receives the GNSS signal based on the third time information may be similar to the manner in which the terminal receives the GNSS signal based on the first time information, including determining a third time window for receiving the GNSS signal based on the third time information. The third time window includes at least one time unit, and the terminal receives the GNSS signal from the satellite in a time unit for receiving the GNSS signal within the third time window. A number of the third time window may be one or more. Correspondingly, the terminal may choose not to perform data transmission with the base station within the third time window.

In the above embodiment, based on the third time information from the base station, the terminal may determine the third time window for receiving the GNSS signal, and receive the GNSS signal from the satellite in the time unit for receiving the GNSS signal within the third time window. In addition, the terminal does not perform data transmission with the base station within the second time window. For the IoT terminal or the terminal with weak capabilities, asynchronous execution of the terminal receiving the GNSS signal and data transmission with the base station is supported.

In some embodiments, the third time information includes at least one of the following: a cycle duration for receiving the GNSS signal, a size of a time window for receiving the GNSS signal in each cycle, time domain position information for receiving the GNSS signal within the time window, or an offset value of a window start position of the time window in each cycle relative to the reference time unit. The meanings of the parameters in the third time information may be the same as the meanings of the parameters in the first time information, which will not be repeated here.

In the above embodiment, the base station may determine the third time information for the terminal to receive the GNSS signal. The third time information includes at least one of the above items, and the terminal may then receive the GNSS signal based on the third time information without performing transmission with the base station. For the IOT terminal or the terminal with weak capabilities, asynchronous execution of the terminal receiving the GNSS signal and data transmission with the base station is supported.

Next, the communication solution provided by the present disclosure will be introduced from the base station side.

Figure 10:
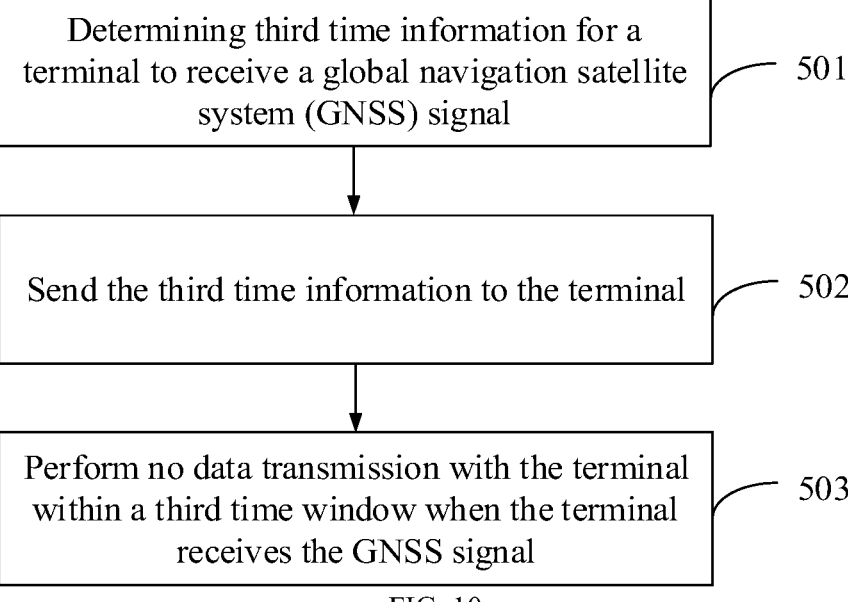
FIG. 10 is a flow chart illustrating a communication method according to an embodiment.

FIG. 10 is a flow chart illustrating a communication method according to an embodiment, which can be used in a base station. The method may include the following steps 501-503.

In Step 501, third time information for a terminal to receive a global navigation satellite system (GNSS) signal is determined.

In Step 502, the third time information is sent to the terminal.

In Step 503, no data transmission with the terminal is performed within a third time window when the terminal receives the GNSS signal.

In the embodiment of the present disclosure, the third time window is the time window for the terminal to receive the GNSS signal, which is determined by the base station based on the third time information, and the number may be one or more. In the above embodiment, the base station may determine the third time information for the terminal and send the third time information to the terminal, and does not perform data transmission with the terminal within the third time window when the terminal receives the GNSS signal. Asynchronous execution of the terminal receiving the GNSS signal and data transmission with the base station is supported, which avoids waste of base station resources.

In some embodiments, the base station may determine the third time information based on at least one of ephemeris information of a satellite that sends the GNSS signal or terminal capability information reported by the terminal.

The ephemeris information includes, but is not limited to, a speed and current location of the satellite. The terminal capability information includes, but is not limited to, a capability for receiving the GNSS signal supported by the terminal.

The above is only an exemplary description, and any solution in which the base station determines the time information for the terminal to receive the GNSS signal in practical applications shall fall within the scope of protection of the present disclosure.

In the above embodiment, the base station can determine the third time information for the terminal to receive the GNSS signal, which is easy to implement and highly usable.

In some embodiments, the base station may send the third time information to the terminal through a second signalling. In some examples, the second signalling may refer to a common signalling sent to the plurality of terminals, including but not limited to system messages.

The base station may also send the third time information to the terminal through a third signalling unicast to the terminal. In some examples, the third signalling refers to a dedicated signalling of the terminal.

In the above embodiments, the base station may send the third time information to the terminal through public signalling or dedicated signalling, which is easy to implement and highly usable.

In some embodiments, based on the third time information determined for the terminal, the base station may determine the third time window for the terminal to receive the GNSS signal. Within the third time window, the base station does not perform data transmission with the terminal, including but not limited to not sending downlink data to the terminal, and not receiving uplink data from the terminal.

In the above embodiments, asynchronous execution of the terminal receiving the GNSS signal and data transmission with the base station is supported, which avoids waste of base station resources.

In some embodiments, the third time information may include but not limited to at least one of the following: the cycle duration for receiving the GNSS signal, the size of the time window for receiving the GNSS signal in each cycle, the time domain position information for receiving the GNSS signal within the time window, or the offset value of the window start position of the time window relative to the reference time unit in each cycle.

FIG. 11 is a flow chart illustrating a communication method according to an embodiment. The method may include the following steps 601-605.

In Step 601, the terminal determines first time information for receiving a global navigation satellite system (GNSS) signal.

In Step 602, the terminal reports the first time information to the base station.

In Step 603, in response to obtaining second time information after updating the first time information, the base station sends the second time information to the terminal.

In Step 604, based on the second time information, the terminal determines a second time window for receiving the GNSS signal.

In Step 605, the terminal receives the GNSS signal from the satellite in a time unit for receiving the GNSS signal within the second time window, and does not perform data transmission with the base station within the second time window.

In Step 606, after determining the second time window for the terminal to receive the GNSS signal based on the second time information, the base station does not perform data transmission with the terminal within the second time window.

In the above embodiment, the first time information for receiving the GNSS signal can be determined by the terminal and then reported to the base station. The base station can update the first time information, and send the obtained second time information to the terminal. The terminal receives the GNSS signal based on the second time information, and the terminal and the base station do not perform mutual data transmission within the second time window. Asynchronous execution of the terminal receiving the GNSS signal and data transmission with the base station is supported, which avoids waste of base station resources.

Figure 12:
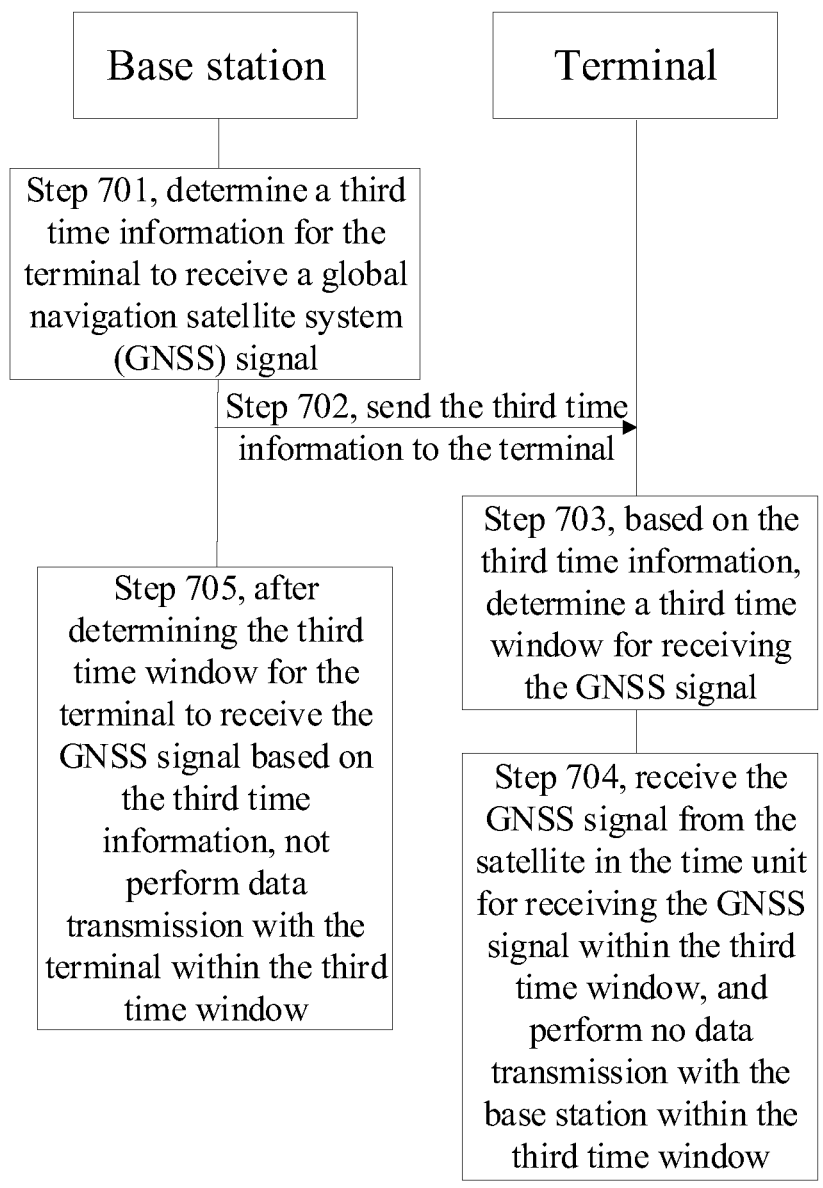
FIG. 12 is a flow chart illustrating a communication method according to an embodiment.

FIG. 12 is a flow chart illustrating a communication method according to an embodiment. The method may include the following steps 701-705.

In Step 701, the base station determines a third time information for the terminal to receive a global navigation satellite system (GNSS) signal.

In Step 702, the base station sends the third time information to the terminal.

In Step 703, based on the third time information, the terminal determines a third time window for receiving the GNSS signal.

In Step 704, the terminal receives the GNSS signal from the satellite in the time unit for receiving the GNSS signal within the third time window. No data transmission with the base station is performed within the third time window.

In Step 705, after determining the third time window for the terminal to receive the GNSS signal based on the third time information, the base station does not perform data transmission with the terminal within the third time window.

In the above embodiment, the base station can determine the third time information for the terminal to receive the GNSS signal, and then send the third time information to the terminal. The terminal receives the GNSS signal based on the third time information, and the terminal and the base station do not perform mutual data exchange within the third time window. Asynchronous execution of the terminal receiving the GNSS signal and data transmission with the base station is supported, which avoids waste of base station resources.

Corresponding to the above embodiments of methods for implementing application functions, the present disclosure also provides embodiments of apparatuses for implementing application functions.

Figure 13:
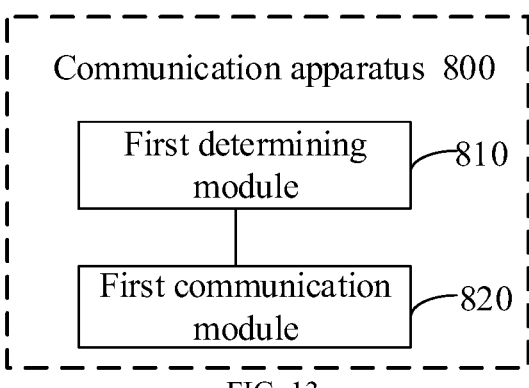
FIG. 13 is a block diagram illustrating a communication apparatus according to an embodiment.

FIG. 13 is a block diagram illustrating a communication apparatus 800 according to an embodiment. The apparatus 800 is used for a terminal, and includes a first determining module 810 and a first communication module 820.

The first determining module 810 is configured to determine a first time information for receiving a global navigation satellite system (GNSS) signal.

The first communication module 820 is configured to, based on the first time information, receive the GNSS signal from a satellite, and perform no data transmission with a base station when the GNSS signal is received.

Figure 14:
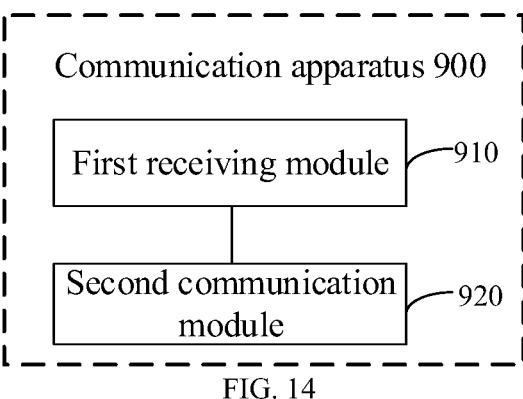
FIG. 14 is a block diagram illustrating a communication apparatus according to an embodiment.

FIG. 14 is a block diagram illustrating a communication apparatus 900 according to an embodiment. The apparatus 900 is used for a base station and includes a first receiving module 910 and a second communication module 920.

The first receiving module 910 is configured to receive a first time information for receiving a global navigation satellite system (GNSS) signal reported by a terminal.

The second communication module 920 is configured to perform no data transmission with the terminal within a first time window when the terminal receives the GNSS signal and wherein the first time window is determined based on the first time information.

Figure 15:
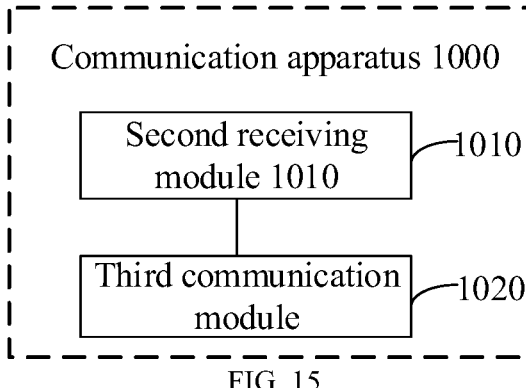
FIG. 15 is a block diagram illustrating a communication apparatus according to an embodiment.

FIG. 15 is a block diagram illustrating a communication apparatus 1000 according to an embodiment. The apparatus 1000 is used for a terminal and includes a second receiving module 1010 and a third communication module 1020.

The second receiving module 1010 is configured to receive third time information from a base station.

The third communication module 1020 is configured to, based on the third time information, receive a global navigation satellite system (GNSS) signal from a satellite, and perform no data transmission with the base station when the GNSS signal is received.

Figure 16:
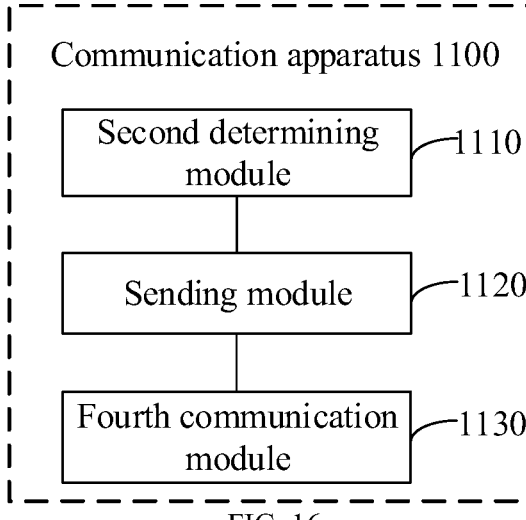
FIG. 16 is a block diagram illustrating a communication apparatus according to an embodiment.

FIG. 16 is a block diagram illustrating a communication apparatus 1100 according to an embodiment. The apparatus 1100 is used for a base station and includes a second determining module 1110, a sending module 1120, and a fourth communication module 1130.

The second determining module 1110 is configured to determine third time information for a terminal to receive a global navigation satellite system (GNSS) signal.

The sending module 1120 is configured to send the third time information to the terminal.

The fourth communication module 1130 is configured to perform no data transmission with the terminal within a third time window when the terminal receives the GNSS signal, wherein the third time window is determined based on the third time information.

For the apparatus embodiments, since they basically correspond to the method embodiments, reference may be made to the partial description of the method embodiments for relevant parts. The apparatus embodiments described above are merely illustrative, where the units described as separate components may or may not be physically separated, and the components shown as units may or may not be physical units. In other words, they may be located in one place or it can be distributed over multiple network units. Some or all of the modules may be selected according to actual needs to achieve the purpose of the solution in the present disclosure. Those of ordinary skill in the art can understand and implement it without exerting any creative effort.

In the present disclosure, there is also provided a computer-readable storage medium having a computer program stored thereon, where the computer program is used for performing any one of the above communication methods for the terminal side.

In the present disclosure, there is also provided a computer-readable storage medium having a computer program stored thereon, where the computer program is used for performing any one of the above communication methods for the base station side.

In the present disclosure, there is also provided a communication apparatus, including: a processor and a memory for storing processor-executable instructions.

Where the processor is configured to perform any one of the above communication methods for the terminal side.

According to a first aspect of the present disclosure, there is provided a communication method used for a terminal, including: determining a first time information for receiving a global navigation satellite system (GNSS) signal; based on the first time information, receiving the GNSS signal from a satellite, and performing no data transmission with a base station when the GNSS signal is received.

In some examples, determining the first time information for receiving the global navigation satellite system (GNSS) signal includes: based on at least one of the terminal capability information or the positioning accuracy requirements, determining the first time information.

In some examples, based on the first time information, receiving the GNSS signal from the satellite includes: based on the first time information, determining a first time window for receiving the GNSS signal; receiving the GNSS signal from the satellite in a time unit for receiving the GNSS signal within the first time window, performing no data transmission with the base station when the GNSS signal is received includes: performing no data transmission with the base station within the first time window.

In some examples, the method further includes: reporting the first time information to the base station.

In some examples, the method further includes: receiving second time information obtained by the base station, updating the first time information; and based on the second time information, receiving the GNSS signal from the satellite, and no data transmission with the base station is performed when the GNSS signal is received. In some examples, based on the second time information, receiving the GNSS signal from the satellite includes: based on the second time information, determining a second time window for receiving the GNSS signal; receiving the GNSS signal from the satellite in a time unit for receiving the GNSS signal within the second time window, performing no data transmission with the base station when the GNSS signal is received includes: performing no data transmission with the terminal within the second time window.

In some examples, the first time information includes at least one of: a cycle duration for receiving the GNSS signal, a size of a time window for receiving the GNSS signal in each cycle, position information of a time unit for receiving the GNSS signal within the time window, an offset value of a window start position of the time window in each cycle relative to a reference time unit.

In some examples, the method further includes: in response to obtaining second time information after updating the first time information, sending the second time information to the terminal.

In some examples, sending the second time information to the terminal includes: sending the second time information to the terminal through a first signalling.

In some examples, the method further includes: performing no data transmission with the terminal within a second time window when the terminal receives the GNSS signal, where the second time window is determined based on the second time information.

According to a second aspect of the present disclosure, there is provided a communication method used for a base station, including: receiving first time information for receiving a global navigation satellite system (GNSS) signal reported by a terminal; performing no data transmission with the terminal within a first time window when the terminal receives the GNSS signal; where the first time window is determined based on the first time information.

In some examples, the method further includes in response to obtaining second time information after updating the first time information, sending the second time information to the terminal.

In some examples, sending the second time information to the terminal includes sending the second time information to the terminal through a first signalling.

In some examples, the method further includes performing no data transmission with the terminal within a second time window when the terminal receives the GNSS signal, where the second time window is determined based on the second time information.

In some examples, the first time information includes at least one of: a cycle duration for receiving the GNSS signal, a size of a time window for receiving the GNSS signal in each cycle, time domain position information for receiving the GNSS signal within the time window, an offset value of a window start position of the time window in each cycle relative to a reference time unit.

According to a third aspect of the present disclosure, there is provided a communication method used for a terminal, including: receiving third time information from a base station; based on the third time information, receiving a global navigation satellite system (GNSS) signal from a satellite, and performing no data transmission with the base station when the GNSS signal is received.

In some examples, based on the third time information, receiving the global navigation satellite system (GNSS) signal from the satellite includes: based on the third time information, determining a third time window for receiving the GNSS signal; receiving the GNSS signal from the satellite in a time unit for receiving the GNSS signal within the third time window, performing no data transmission with the base station when the GNSS signal is received includes: performing no data transmission with the base station within the third time window.

In some examples, the third time information includes at least one of: a cycle duration for receiving the GNSS signal, a size of a time window for receiving the GNSS signal in each cycle, time domain position information for receiving the GNSS signal within the time window, an offset value of a window start position of the time window in each cycle relative to a reference time unit.

According to a fourth aspect of the present disclosure, there is provided a communication method used for a base station, including: determining third time information for a terminal to receive a global navigation satellite system (GNSS) signal; sending the third time information to the terminal; performing no data transmission with the terminal within a third time window when the terminal receives the GNSS signal, where the third time window is determined based on the third time information.

In some examples, determining the third time information for the terminal to receive the global navigation satellite system (GNSS) signal includes: based on at least one of the ephemeris information of a satellite that sends the GNSS signal or the terminal capability information reported by the terminal, determining the third time information. In some examples, sending the third time information to the terminal includes: sending the third time information to the terminal through a second signalling sent to a plurality of terminals, or sending the third time information to the terminal through a third signalling unicast to the terminal.

In some examples, the third time information includes at least one of: a cycle duration for receiving the GNSS signal, a size of a time window for receiving the GNSS signal in each cycle, time domain position information for receiving the GNSS signal within the time window, an offset value of a window start position of the time window in each cycle relative to a reference time unit.

The technical solution provided by the embodiments of the present disclosure can include the following beneficial effects.

In the embodiment of the present disclosure, the terminal can determine the first time information for receiving the GNSS signal, so as to receive the GNSS signal from the satellite based on the first time information. While receiving the GNSS signal, the terminal does not perform data transmission with the base station. Asynchronous execution of the terminal receiving the GNSS signal and data transmission with the base station is supported.

In the embodiment of the present disclosure, the terminal may determine the first time information for receiving the GNSS signal based on at least one of its own terminal capability information or the positioning accuracy requirements, which is easy to implement and highly usable.

In the embodiment of the present disclosure, based on the first time information, the terminal may determine the first time window for receiving the GNSS signal, and receive the GNSS signal from the satellite in the time unit for receiving the GNSS signal within the first time window. In addition, the terminal does not perform data transmission with the base station within the first time window. Asynchronous execution of the terminal receiving the GNSS signal and data transmission with the base station is supported.

In the embodiment of the present disclosure, the terminal may report the first time information to the base station, and based on the first time information, the base station determines the first time window for the terminal to receive the GNSS signal, so that no data transmission with the terminal is performed within the first time window. Asynchronous execution of the terminal receiving the GNSS signal and data transmission with the base station is supported, which avoids waste of base station resources.

In the embodiment of the present disclosure, the base station obtains the second time information by updating the first time information from the terminal. After receiving the second time information, the terminal may receive the GNSS signal based on the second time information. And no data transmission with the base station is performed within a second time window determined based on second time information. A synchronous execution of the terminal receiving the GNSS signal and data transmission with the base station is supported.

In the embodiment of the present disclosure, the base station can also directly determine the third time information for receiving a GNSS signal for the terminal and send the third time information to the terminal. The terminal receives the GNSS signal based on the third time information and does not perform data transmission with the base station when receiving the GNSS signal. Asynchronous execution of the terminal receiving the GNSS signal and data transmission with the base station is realized.

Figure 17:
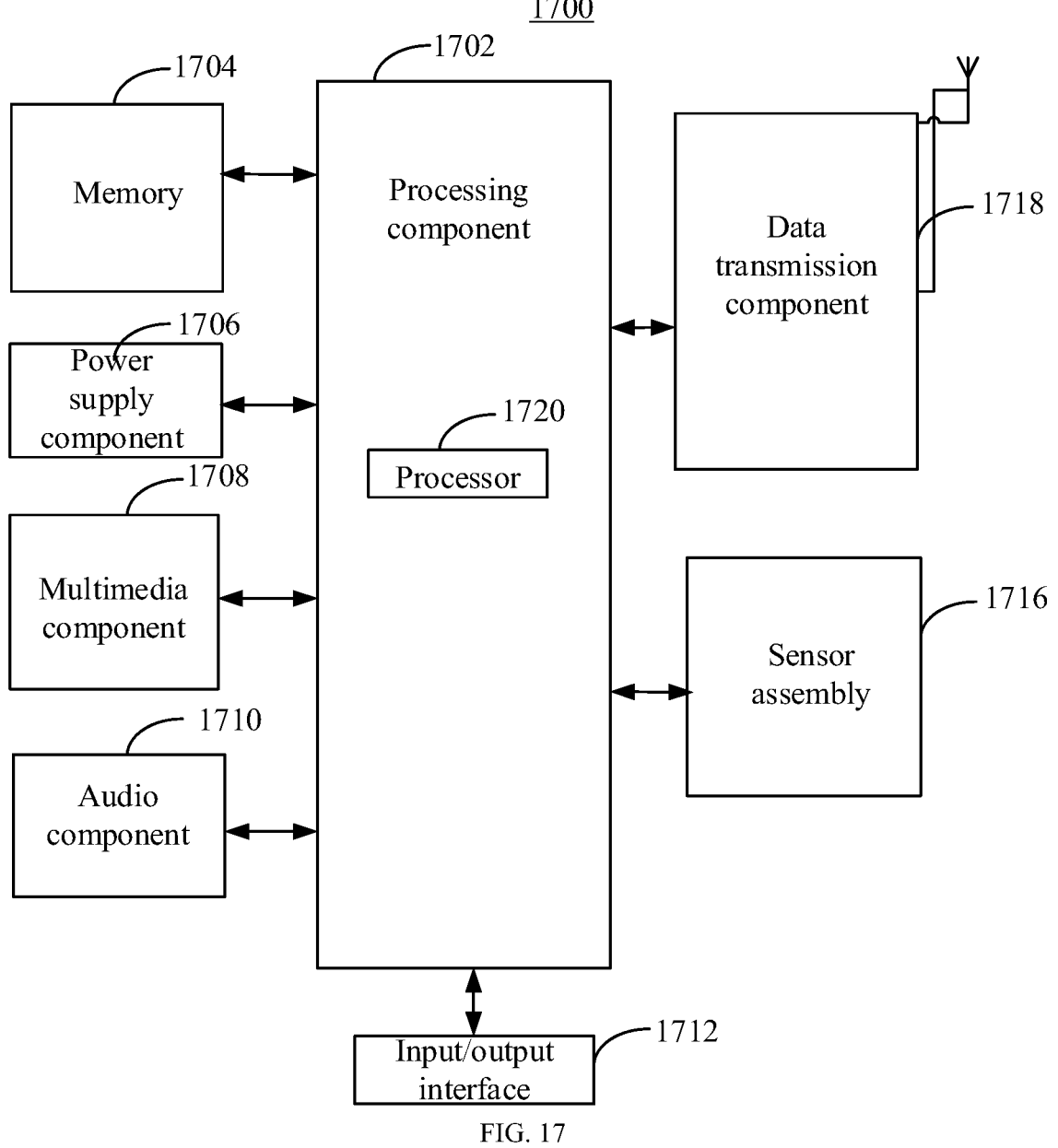
FIG. 17 is a block diagram illustrating an electronic device according to an embodiment.

FIG. 17 is a block diagram illustrating an electronic device 1700 according to an embodiment of the present disclosure. For example, the electronic device 1700 may be a mobile phone, a tablet computer, an e-book reader, a multimedia player, a wearable device, a vehicle-mounted terminal, an iPad, a smart TV, etc.

Referring to FIG. 17, the electronic device 1700 may include one or more components: a processing component 1702, a memory 1704, a power supply component 1706, a multimedia component 1708, an audio component 1710, an input/output (I/O) interface 1712, a sensor component 1716, and a data transmission component 1718.

The processing component 1702 generally controls the overall operation of the electronic device 1700, such as operations associated with display, telephone calling, data transmission, camera operation, and recording operation. The processing component 1702 may include one or more processors 1720 to execute instructions to perform all or part of the steps of the communication method described above. In addition, the processing component 1702 may include one or more modules to facilitate interaction between the component 1702 and the other components. For example, the processing component 1702 may include a multimedia module to facilitate interaction between the multimedia component 1708 and the processing component 1702. For another example, the processing component 1702 may read the executable instructions from the memory to realize the steps of the communication method provided by each of the above embodiments.

The memory 1704 is configured to store various types of data to support operation on the electronic device 1700. Examples of such data include instructions for any application or method for operating on the electronic device 1700, contact data, phonebook data, messages, pictures, videos, or the like. The memory 1704 may be implemented by any type of volatile or non-volatile storage device or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic or Optical disk.

The power supply assembly 1706 provides electrical power to the various components of the electronic device 1700. The power supply assembly 1706 may include a power management system, one or more power sources, and other components associated with generating, managing, and distributing power for the electronic device 1700.

The multimedia component 1708 includes a display screen that provides an output interface between the electronic device 1700 and a user. In some embodiments, the multimedia component 1708 includes a front camera and/or a rear-facing camera. When the electronic device 1700 is in an operation mode, such as a shooting mode or a video mode, the front camera and/or the rear camera may receive external multimedia data. Each of the front and rear cameras can be a fixed optical lens system or have a focal length and optical zoom capability.

The audio component 1710 is configured to output and/or input audio signals. For example, the audio component 1710 includes a microphone (MIC) configured to receive external audio signals when the electronic device 1700 is in an operating mode, such as a calling mode, a recording mode, or a voice recognition mode. The received audio signal may be further stored in the memory 1704 or sent via the data transmission component 1718. In some embodiments, the audio component 1710 also includes a speaker for outputting audio signals.

The I/O interface 1712 provides an interface between the processing component 1702 and a peripheral interface module, which may be a keyboard, a click wheel, a button, or the like. These buttons may include, but are not limited to, a home button, volume buttons, a start button, and a lock button.

The sensor assembly 1716 includes one or more sensors for providing a status assessment of various aspects of the electronic device 1700. For example, the sensor assembly 1716 may detect an on/off state of the electronic device 1700, the relative positioning of components, such as the display and the keypad of the electronic device 1700, and the sensor assembly 1716 may also detect a change in the position of the electronic device 1700 or a component of the electronic device 1700, the presence or absence of user contact with the electronic device 1700, the electronic device 1700 orientation or acceleration/deceleration and the temperature change of the electronic device 1700. The sensor assembly 1716 may include a proximity sensor configured to detect the presence of nearby objects in the absence of any physical contact. The sensor assembly 1716 may also include an optical sensor, such as a CMOS or CCD image sensor, for use in imaging applications. In some embodiments, the sensor assembly 1716 may also include an acceleration sensor, a gyroscope sensor, a magnetic sensor, a pressure sensor, or a temperature sensor.

The data transmission component 1718 is configured to facilitate wired or wireless communication between the electronic device 1700 and other devices. The electronic device 1700 may access a wireless network based on a data transmission standard, such as WiFi, 2G, 3G, 4G, 5G, 6G, or a combination thereof. In one embodiment, the data transmission component 1718 receives broadcast signals or broadcast-related information from an external broadcast management system via a broadcast channel. In one exemplary embodiment, the data transmission component 1718 also includes a Near-Field Communication (NFC) module to facilitate short-range data transmission. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an embodiment, the electronic device 1700 may be implemented by one or more Application Specific Integrated Circuits (ASIC), Digital Signal Processors (DSP), Digital Signal Processing Devices (DSPD), Programmable Logic Devices (PLD), Field Programmable Door Arrays (FPGA), a controller, a micro-controller, a micro-processor, or other electronic elements for any one of the above communication methods for the terminal side.

In an exemplary embodiment, there is also provided a non-temporary machine-readable storage medium including instructions, for example, a memory 1704 including instructions that may be executed by the processor 1720 of the electronic device 1700 to complete the above-mentioned communication method. For example, the non-temporary computer-readable storage medium may be ROM, Random Access Memory (RAM), CD-ROM, magnetic tape, floppy disk, optical data storage device, or the like.

In the present disclosure, a communication apparatus is also provided and includes a processor and a memory for storing processor-executable instructions. Where the processor is configured to perform any one of the above communication methods for the base station side.

Figure 18:
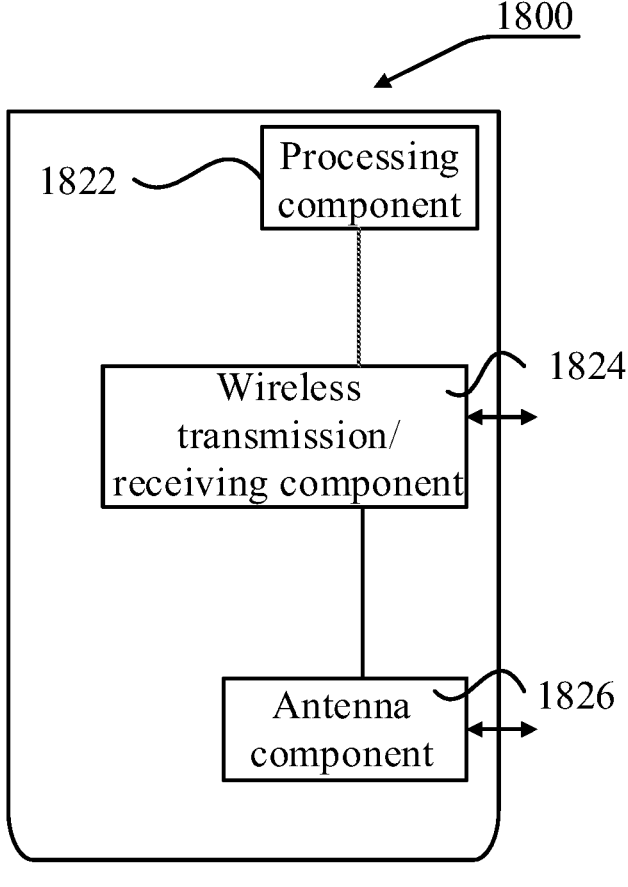
FIG. 18 is a block diagram illustrating a communication apparatus according to an embodiment.

FIG. 18 is a block diagram illustrating a communication apparatus 1800 according to an embodiment of the present disclosure. The apparatus 1800 may be provided as a base station. Referring to FIG. 18, the apparatus 1800 includes a processing component 1822, a wireless transmission/receiving component 1824, an antenna component 1826, and a signal processing portion specific to a wireless interface. The processing component 1822 may further include one or more processors One of the processors in the processing component 1822 may be configured to implement any one of the above communication methods for the base station side.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It should be understood that the present disclosure is not limited to the precise structures already described above and illustrated in the accompanying drawings, and that a variety of modifications and changes can be made without departing from the scope thereof. The scope of this disclosure is limited only by the appended claims.

The invention claimed is:

1. A communication method performed by a terminal, comprising:
   determining first time information for receiving a global navigation satellite system (GNSS) signal, comprising:
      based on at least one of terminal capability information or positioning accuracy requirements, determining the first time information;
   based on the first time information, receiving the GNSS signal from a satellite, and performing no data transmission with a base station in a case that the GNSS signal is received;
   wherein receiving the GNSS signal from the satellite based on the first time information comprises:
      based on the first time information, determining a first time window for receiving the GNSS signal, and receiving the GNSS signal from the satellite in a time unit for receiving the GNSS signal within the first time window.

2. The method of claim 1, further comprising:
   reporting the first time information to the base station.

3. The method of claim 2, further comprising:
   receiving second time information obtained by the base station updating the first time information;
   based on the second time information, receiving a second GNSS signal from the satellite, and no data transmission with the base station is performed in a case that the second GNSS signal is received.

4. The method of claim 3, wherein
   receiving the second GNSS signal from the satellite comprises:
      based on the second time information, determining a second time window for receiving the second GNSS signal, and
      receiving the second GNSS signal from the satellite in a time unit for receiving the GNSS signal within the second time window; and performing no data transmission with the base station in a case that the second GNSS signal is received comprises:

performing no data transmission with the terminal within the second time window.

5. The method of claim 1, wherein the first time information includes at least one of:

a cycle duration for receiving the GNSS signal, a size of a time window for receiving the GNSS signal in each cycle, position information of a time unit for receiving the GNSS signal within the time window, an offset value of a window start position of the time window in each cycle relative to a reference time unit.

6. A communication method performed by a base station, comprising:

receiving first time information for receiving a global navigation satellite system (GNSS) signal reported by a terminal; and performing no data transmission with the terminal within a first time window in a case that the terminal receives the GNSS signal, and wherein the first time window is determined based on the first time information, wherein the first tine information is determined based on at least one of terminal capability information or positioning accuracy requirements.

7. The method of claim 6, further comprising:

in response to obtaining second time information after updating the first time information, sending the second time information to the terminal.

8. The method of claim 7, wherein sending the second time information to the terminal comprises:

sending the second time information to the terminal through a first signaling.

9. The method of claim 7, further comprising:

performing no data transmission with the terminal within a second time window in a case that the terminal receives the GNSS signal, wherein the second time window is determined based on the second time information.

10. The method of claim 6, wherein the first time information includes at least one of:

a cycle duration for receiving the GNSS signal, a size of a time window for receiving the GNSS signal in each cycle, time domain position information for receiving the GNSS signal within the time window, an offset value of a window start position of the time window in each cycle relative to a reference time unit.

11. A communication method performed by a base station, comprising:

determining third time information for a terminal to receive a global navigation satellite system (GNSS) signal;

sending the third time information to the terminal; and performing no data transmission with the terminal within a third time window in a case that the terminal receives the GNSS signal, and wherein the third time window is determined based on the third time information, and determining the third time information for the terminal to receive the GNSS signal comprises:

based on at least one of ephemeris information of a satellite that sends the GNSS signal or terminal capability information reported by the terminal, determining the third time information.

12. The method of claim 11, wherein sending the third time information to the terminal comprises:

sending the third time information to the terminal through a second signaling sent to a plurality of terminals, or sending the third time information to the terminal through a third signaling unicast to the terminal.

13. The method of claim 11, wherein the third time information includes at least one of:

a cycle duration for receiving the GNSS signal, a size of a time window for receiving the GNSS signal in each cycle, time domain position information for receiving the GNSS signal within the time window, an offset value of a window start position of the time window in each cycle relative to a reference time unit.

14. A communication apparatus, comprising:

a processor; and a memory for storing processor-executable instructions, wherein the processor is configured to perform the communication method according to claim 1.

15. A communication apparatus, comprising:

a processor; and a memory for storing processor-executable instructions, wherein the processor is configured to perform the communication method according to claim 6.

16. A communication system, comprising:

a terminal; and a base station configured to receive first time information for receiving a global navigation satellite system (GNSS) signal reported by the terminal;

performing no data transmission with the terminal within a first time window in a case that the terminal receives the GNSS signal, wherein the first time window is determined based on the first time information, wherein the first time information is determined based on at least one of terminal capability information or positioning accuracy requirements, and wherein the terminal is configured to perform the communication method of claim 1.

17. A communication system, comprising:

a base station; and a terminal, configured to receive third time information from the base station; and based on the third time information, receiving a global navigation satellite system (GNSS) signal from a satellite, and performing no data transmission with the base station in a case that the GNSS signal is received, wherein the third time window is determined based on the third time information, and wherein the base station is configured to perform the communication method of claim 11.

18. The method according to claim 3, wherein receiving the second time information obtained by the base station updating the first time information comprises:

receiving the second time information sent by the base station through a first signaling, wherein the first signaling comprises at least one of:

a Radio Resource Control (RRC) signaling;

a Media Access Control Address (MAC) Control Element (CE) signaling; or a physical-layer signaling.

19. The method according to claim 1, wherein the positioning accuracy requirements comprise a frequency for acquiring the GNSS signal.

20. The method according to claim 5, wherein at least one of the size of the time window for receiving the GNSS signal
in each cycle comprises a number of time units occu-
pied by the time window in each cycle; or
the position information of the time unit for receiving the
GNSS signal within the time window comprises:
all positions within the time window, or
at least one specified position within the time window.

\* \* \* \* \*